United States Patent
Park

(10) Patent No.: US 10,803,550 B2
(45) Date of Patent: Oct. 13, 2020

(54) IMAGE PROCESSING DEVICE CONTROLLING SCALING RATIO OF SUB-IMAGE DATA AND DISPLAY DEVICE INCLUDING THE SAME

(71) Applicant: Samsung Display Co., Ltd., Yongin-Si, Gyeonggi-Do (KR)

(72) Inventor: Jong-Woong Park, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/697,497

(22) Filed: Nov. 27, 2019

(65) Prior Publication Data

US 2020/0098089 A1   Mar. 26, 2020

Related U.S. Application Data

(63) Continuation of application No. 14/996,639, filed on Jan. 15, 2016, now abandoned.

(30) Foreign Application Priority Data

Jul. 7, 2015 (KR) .................. 10-2015-0096244

(51) Int. Cl.
*G06T 3/40* (2006.01)
*G09G 3/20* (2006.01)

(52) U.S. Cl.
CPC ............ *G06T 3/4007* (2013.01); *G09G 3/20* (2013.01); *G09G 2320/0257* (2013.01); *G09G 2320/103* (2013.01); *G09G 2340/045* (2013.01); *G09G 2340/0442* (2013.01)

(58) Field of Classification Search
None
See application file for complete search history.

(56) References Cited

U.S. PATENT DOCUMENTS

| | | | |
|---|---|---|---|
| 6,348,929 B1 | 2/2002 | Acharya et al. | |
| 7,751,652 B2 | 7/2010 | Tighe | |
| 2003/0085906 A1 | 5/2003 | Elliott et al. | |
| 2004/0179029 A1* | 9/2004 | Ogawa | G09G 3/3688 345/690 |
| 2006/0007250 A1 | 1/2006 | Jung et al. | |
| 2006/0279490 A1 | 12/2006 | Park et al. | |
| 2008/0019612 A1 | 1/2008 | Koyanagi | |
| 2008/0111886 A1* | 5/2008 | Bai | H04N 5/144 348/173 |
| 2008/0238858 A1* | 10/2008 | Seong | G09G 3/3426 345/102 |
| 2008/0238947 A1 | 10/2008 | Keahey et al. | |
| 2009/0268977 A1* | 10/2009 | Ha | G09G 3/3208 382/254 |
| 2009/0309903 A1* | 12/2009 | Park | G09G 5/005 345/690 |
| 2010/0085340 A1 | 4/2010 | Omoto et al. | |
| 2010/0117975 A1 | 5/2010 | Cho | |

(Continued)

*Primary Examiner* — Hilina K Demeter
(74) *Attorney, Agent, or Firm* — Cantor Colburn LLP

(57) ABSTRACT

An image processing device includes an image determiner which determines whether an image data is a still image or a motion picture image, a first compensator which gradually changes a scaling ratio of the image data of which a center part is fixed and a second compensator which divides the image data into a plurality of sub-image data and change a scaling ratio of the sub-image data.

7 Claims, 7 Drawing Sheets

(56) References Cited

U.S. PATENT DOCUMENTS

| | | | |
|---|---|---|---|
| 2010/0149148 A1* | 6/2010 | Choe | G09G 5/00 |
| | | | 345/208 |
| 2010/0156951 A1* | 6/2010 | Park | G09G 3/3648 |
| | | | 345/690 |
| 2011/0037785 A1* | 2/2011 | Shiomi | G09G 3/3406 |
| | | | 345/690 |
| 2013/0033448 A1 | 2/2013 | Yano et al. | |
| 2013/0207951 A1 | 8/2013 | Didyk et al. | |
| 2014/0347403 A1* | 11/2014 | Song | G09G 3/3291 |
| | | | 345/690 |
| 2014/0375694 A1* | 12/2014 | Ohba | G06T 3/40 |
| | | | 345/660 |

\* cited by examiner

IMAGE PROCESSING DEVICE CONTROLLING SCALING RATIO OF SUB-IMAGE DATA AND DISPLAY DEVICE INCLUDING THE SAME

This application is a continuation application of U.S. patent application Ser. No. 14/996,639, filed on Jan. 15, 2016, which claims priority to Korean Patent Application No. 10-2015-0096244, filed on Jul. 7, 2015, the content of which in its entirety is herein incorporated by reference.

BACKGROUND

1. Field

Exemplary embodiments relate generally to an image processing device. More particularly, exemplary embodiments of the invention relate to an image processing device and a display device having the same.

2. Description of the Related Art

A flat panel display ("FPD") device is widely used as a display device of electronic devices because the FPD device is relatively lightweight and thin compared to a cathode-ray tube ("CRT") display device. Examples of the FPD device include, for example, a liquid crystal display ("LCD") device, a field emission display ("FED") device, a plasma display panel ("PDP") device, and an organic light emitting display ("OLED") device. The OLED device has been spotlighted as next-generation display devices because the OLED device has various advantages such as a wide viewing angle, a rapid response speed, a thin profile, low power consumption, etc.

SUMMARY

An image sticking may occur on display devices by degradation of pixels as a result of driving the pixels over time.

Exemplary embodiments provide an image processing device which prevents an image sticking of a display device.

Exemplary embodiments provide a display device which prevents an image sticking.

According to an exemplary embodiment of exemplary embodiments, an image processing device may include an image determiner which determines whether an image data is a still image or a motion picture image, a first compensator which gradually changes a scaling ratio of the image data of which a center part is fixed, and a second compensator which divides the image data into a plurality of sub-image data and change a scaling ratio of the sub-image data.

In exemplary embodiments, the image determiner may provide a first compensating signal to the first compensator or the second compensator when the image data is the still image and the image determiner may provide a second compensating signal to the first compensator or the second compensator when the image data is the motion picture image.

In exemplary embodiments, the first compensator may gradually expand or reduce the image data of which the center part is fixed in response to the first compensating signal.

In exemplary embodiments, the first compensator may expand or reduce the image data based on the scaling ratio.

In exemplary embodiments, the first compensator may restore the image data by gradually expanding the image data of which the center part is fixed in response to the second compensating signal.

In exemplary embodiments, the second compensator may reduce one of the sub-image data in response to the first compensating signal.

In exemplary embodiments, the second compensator may control the scaling ratio of the sub-image data that is not reduced.

In exemplary embodiments, the second compensator may restore the sub-image data of which scaling ratio is changed in response to the second compensating signal.

In exemplary embodiments, the image determiner alternately provides the first compensating signal to the first compensator and the second compensator when the image data is the still image.

According to exemplary embodiments, a display device may include a display panel including a plurality of pixels, an image processor which gradually changes a scaling ratio of an image data of which a center part is fixed or change a scaling ratio of sub-image data into which the image data is divided based on whether the image data is a still image or a motion picture image, a scan driver which provides a scan signal to the pixels, a data driver which provides a data signal to the pixels, and a timing controller which generates a control signal that controls the scan driver and the data driver.

In exemplary embodiments, the image processor may include an image determiner which determines whether the image data is the still image or the motion picture image, a first compensator which gradually changes the scaling ratio of the image data of which the center part is fixed, and a second compensator which divides the imaged data into the sub-image data and change the scaling ratio of the sub-image data different from each other.

In exemplary embodiments, the image determiner may provide a first compensating signal to the first compensator or the second compensator when the image data is the still image and the image determiner may provide a second compensating signal to the first compensator or the second compensator when the image data is the motion picture image.

In exemplary embodiments, the first compensator may gradually expand or reduce the image data of which the center part is fixed in response to the first compensating signal.

In exemplary embodiments, the first compensator may expand or reduce the image data based on the scaling ratio.

In exemplary embodiments, the first compensator may restore the image data by gradually expanding the image data of which the center part is fixed in response to the second compensating signal.

In exemplary embodiments, the second compensator may reduce one of the sub-image data in response to the first compensating signal.

In exemplary embodiments, the second compensator may control the scaling ratio of the sub-image data that is not reduced.

In exemplary embodiments, the second compensator may restore the sub-image data of which the scaling ratio is changed in response to the second compensating signal.

In exemplary embodiments, the image determiner may alternately provide the first compensating signal to the first compensator and the second compensator in a predetermined cycle when the image data is the still image.

In exemplary embodiments, the image processor may be coupled to the timing controller or located in the timing controller.

Therefore, an image processing device and a display device having the same according to exemplary embodiments may prevent an image sticking occurs on a display panel by changing a scaling ratio of an image data when the image data is a still image.

BRIEF DESCRIPTION OF THE DRAWINGS

Illustrative, non-limiting exemplary embodiments will be more clearly understood from the following detailed description taken in conjunction with the accompanying drawings.

FIG. 7 is implemented as a smart phone.

DETAILED DESCRIPTION

Figure 1:
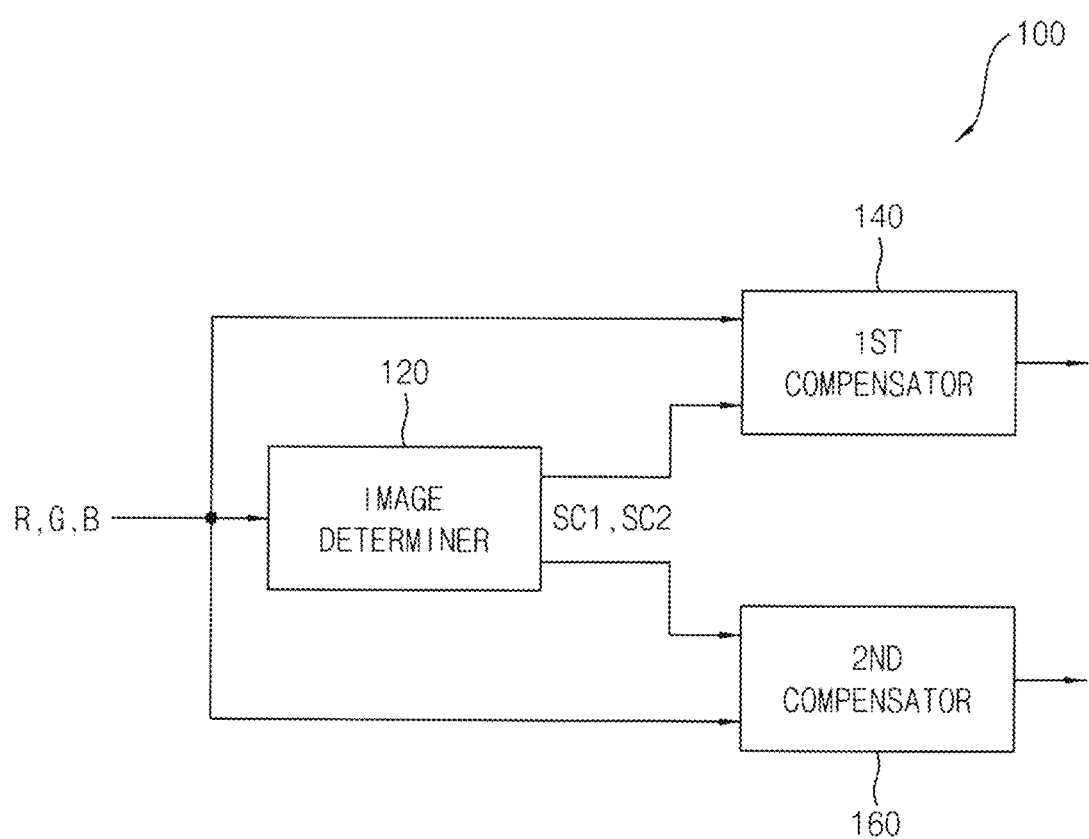
FIG. 1 is a block diagram illustrating exemplary embodiments of an image processing device according to the invention.

Hereinafter, the invention will be explained in detail with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an image processing device according to exemplary embodiments.

Referring to FIG. 1, an image processing device 100 may include an image determiner 120, a first compensator 140, and a second compensator 160.

The image determiner 120 may determine whether image data R, G, B is a still image or a motion picture image. The image data R, G, B may include a red image data, a green image data, and a blue image data. However, the invention is not limited thereto, and the image data may include various other color image data. In an exemplary embodiment, the image determiner 120 may receive the image data R, G, B every frame and may compare the image data R, G, B of a previous frame and the image data R, G, B of a current frame, for example. The image determiner 120 may determine whether the image data R, G, B is the still image or the motion picture image based on a difference between the image data R, G, B of the previous frame and the image data R, G, B of the current frame. The image determiner 120 may provide a first compensating signal SC1 to the first compensator 140 or the second compensator 160 when the image data R, G, B is the still image and may provide a second compensating signal SC2 to the first compensator 140 or the second compensator 160 when the image data R, G, B is the motion picture image. Here, the image determiner 120 may alternately provide the first compensating signal SC1 to the first compensator 140 and the second compensator 160 when the image data R, G, B is the still image.

The first compensator 140 may gradually change a scaling ratio of the image data R, G, B of which a center part is fixed. The center part of the image data R, G, B may be a point where two diagonal lines are crossed. In an exemplary embodiment, the center part of the image data R, G, B may include a pixel or a plurality of pixels. The first compensator 140 may gradually expand or reduce the image data R, G, B of which the center part is fixed in response to the first compensating signal SC1, for example. Here, the first compensator 140 may expand or reduce the image data R, G, B based on the scaling ratio. The first compensator 140 may gradually reduce the image data R, G, B of which the center part is fixed when the first compensating signal SC1 is provided to the first compensator 140 (that is, when the image data R, G, B is the still image). In an exemplary embodiment, the first compensator 140 may reduce the image data of which the center part of the image data R, G, B is fixed by one pixel in each of four directions (e.g., up, down, left, and right) in a predetermined cycle, for example. The first compensator 140 may expand the image data by one pixel in each of four directions (e.g., up, down, left, and right) when the image data R, G, B is reduced by a predetermined size. As described above, the first compensator 140 may prevent an image sticking that occurs on a display panel by gradually expanding or reducing the image data R, G, B when the first compensating signal SC1 is provided to the first compensator 140. Here, the image data R, G, B may be expanded or reduced based on the predetermined scaling ratio. The first compensator 140 may further include a storing device that stores the scaling ratio or a calculator that calculates the scaling ratio. In an exemplary embodiment, the image data R, G, B may be expanded or reduced using a bilinear interpolation method, a bicubic interpolation method, or a lanczos interpolation method, for example.

The first compensator 140 may restore the image data R, G, B by gradually expanding the image data R, G, B in response to the second compensating signal SC2. The first compensator 140 may restore the image data R, G, B that is changed for preventing the image sticking because the image sticking does not occur when the second compensating signal SC2 is provided to the first compensator 140 (that is, when the image data R, G, B is the motion picture image). Here, the first compensator 140 may gradually expand the image data R, G, B that is reduced in response to the first compensating signal SC1 for a user not to recognize the variation of the image data R, G, B. In an exemplary embodiment, the first compensator 140 may expand the image data by one pixel in each of the four directions (e.g., up, down, left, and right) in the predetermined cycle although the image data R, G, B is not reduced by the predetermined size when the second compensating signal SC2 is provided, for example.

The second compensator 160 may divide the image data R, G, B into a plurality of sub-image data and change the scaling ratios of the sub-image data different from each other. The second compensator 160 may reduce one of the sub-image data in response to the first compensating signal SC1. The second compensator 160 may control the scaling ratios of the sub-image data that are not reduced. The second compensator 160 may divide the image data R, G, B into the sub-image data in a first direction or a second direction when the first compensating signal SC1 is provided (that is, the image data R, G, B is the still image) to the second compensator 160. In an exemplary embodiment, the second compensator 160 may divide the image data R, G, B into a first sub-image data, a second sub-image data, a third sub-image data, and a fourth sub-image data in the first direction and the second direction, for example. The second compensator 160 may reduce the first sub-image data based on a predetermined scaling ratio and control the scaling ratios of the second sub-image data, the third sub-image data, and the fourth sub-image data based on the predetermined scaling ratio of the first sub-image data. The second compensator 160 may reduce the second sub-image data based on a predetermined scaling ratio and control the scaling ratio of the first sub-image data, the third sub-image data, and fourth sub-image data based on the predetermined scaling ratio of the second sub-image data. The second compensator 160 may sequentially reduce the third sub-image data and the fourth sub-image data and control the scaling ratio of other sub-image data using the same method. As described above, the second compensator 160 may prevent the image sticking that occurs on the display panel by reducing one of the sub-image data and controlling the scaling ratio of other sub-image data. Here, the sub-image data may be reduced or expanded based on the predetermined scaling ratio. The second compensator 160 may further include a storing device that stores the scaling ratio or a calculator that calculates the scaling ratio. In an exemplary embodiment, the image data R, G, B may be expanded or reduced using the bilinear interpolation method, the bicubic interpolation method, or the lanczos interpolation method, for example.

The second compensator 160 may restore the sub-image data of which scaling ratio are changed in response to the second compensating signal SC2. The second compensator 160 may restore the sub-image data that is changed for preventing the image sticking because the image sticking does not occur when the second compensating signal SC2 is provided to the second compensator 160 (that is, when the image data R, G, B is the motion picture image).

The first compensator 140 and the second compensator 160 may be alternately operated in response to the first compensating signal SC1 provided from the image determiner 120. The image sticking may occur on the pixels in the center point of the image data R, G, B because the first compensator 140 prevent the image sticking by expanding or reducing the image data R, G, B of which the center part is fixed. Further, the image sticking may occur on the pixels in an edge of the image data R, G, B because the second compensator 160 prevent the image sticking by changing the scaling ratio of the sub-image data. The image sticking that occurs on the pixels in the center point of the image data R, G, B or in the edge of the image data R, G, B may be prevented for the image determiner 120 to alternately provide the first compensating signal SC1 to the first compensator 140 and the second compensator 160 when the image data R, G, B is the still image. In an exemplary embodiment, the image determiner 120 may provide the first compensating signal SC1 to the first compensator 140 when the image data R, B is the still image, for example. The first compensator 140 may gradually reduce or expand the image data R, G, B of which the center point is fixed in response to the first compensating signal SC1. The image determiner 120 may provide the first compensating signal SC1 to the second compensator 160 after a predetermined time. The second compensator 160 may divide the image data R, G, B into the sub-image data, sequentially reduce the sub-image data in response to the first compensating signal SC1 and control the scaling ratios of the sub-image data that is not reduced. The image determiner 120 may provide the first compensating signal SC1 to the first compensator 140 after the predetermined time.

As described above, the image processing device 100 of FIG. 1 may include the first compensator 140 that prevents the image sticking by reducing or expanding the image data R, G, B of which the center part is fixed and the second compensator 160 that prevents the image sticking by changing the scaling ratios of the sub-image data of which the edge is fixed when the image data R, G, B is the still image. Thus, the image sticking that occurs on the display panel by the image data R, G, B may be prevented.

Figure 2:
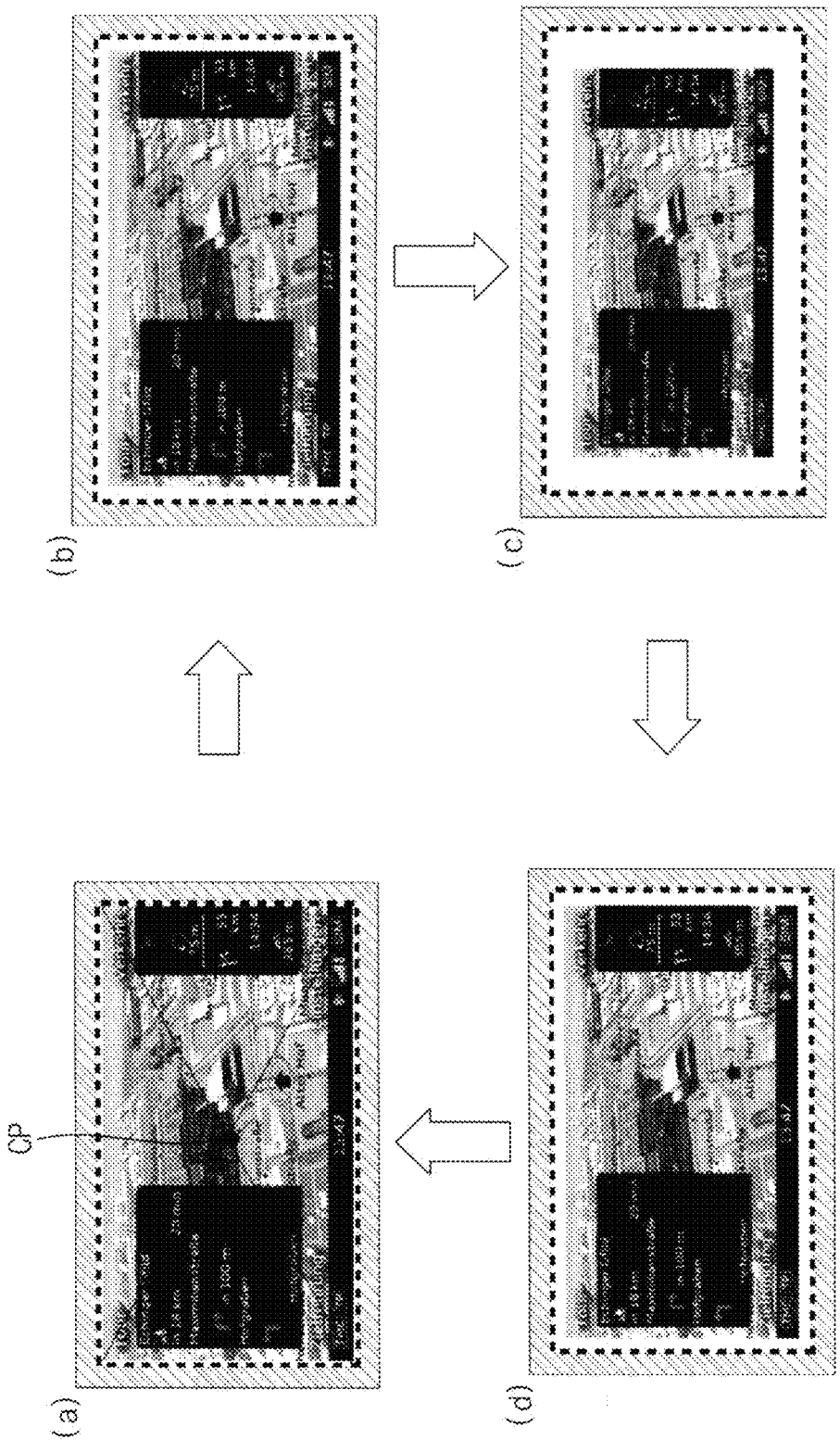
FIG. 2 is a diagram illustrating for describing an operation of a first compensator included in the image processing device of FIG. 1.

FIG. 2 is a diagram illustrating for describing an operation of a first compensator 140 included in the image processing device of FIG. 1.

The first compensating signal SC1 (refer to FIG. 1) may be provided to the first compensator 140 when the image data is the still image. Referring to FIG. 2, the first compensator 140 may change the scaling ratio of the image data of which the center part CP is fixed. Here, the center part CP of the image data may be the point where two diagonal lines are crossed. In an exemplary embodiment, the center part CP may include a pixel or a plurality of pixels, for example. The first compensator 140 may reduce the image data by changing the scaling ratio of the image data when the first compensating signal SC1 is provided to the first compensator 140. In an exemplary embodiment, the image data may be reduced in the four directions (e.g., up, down, left, and right) as described in (b), for example. Further, the image data may be more reduced in the four directions (e.g., up, down, left, and right) after a predetermined time as described in (c). The image data may be gradually reduced to the predetermined size. In an exemplary embodiment, the image data may be reduced by 10 pixels in the four directions (e.g., up, down, left, and right) in the predetermined cycle. The first compensator 140 may expand the image data by changing the scaling ratio of the image data when the image data is reduced to the predetermined size. In an exemplary embodiment, the image data may be expanded in the four directions (e.g., up, down, left, and right) as described in (d), for example. The image data may be gradually expanded until the size of the image data is the same as the original image data. However, the image data may be gradually expanded although the image data is not reduced to the predetermined size when the second compensating signal SC2 (refer to FIG. 1) is provided to the first compensator 140. As described above, the first compensator 140 may prevent the image sticking that occurs on the display panel by changing the scaling ratio of the image data. Here, the first compensator 140 may prevent the user to recognize the variation of the image data by gradually reducing or expanding the image data.

Figure 3:
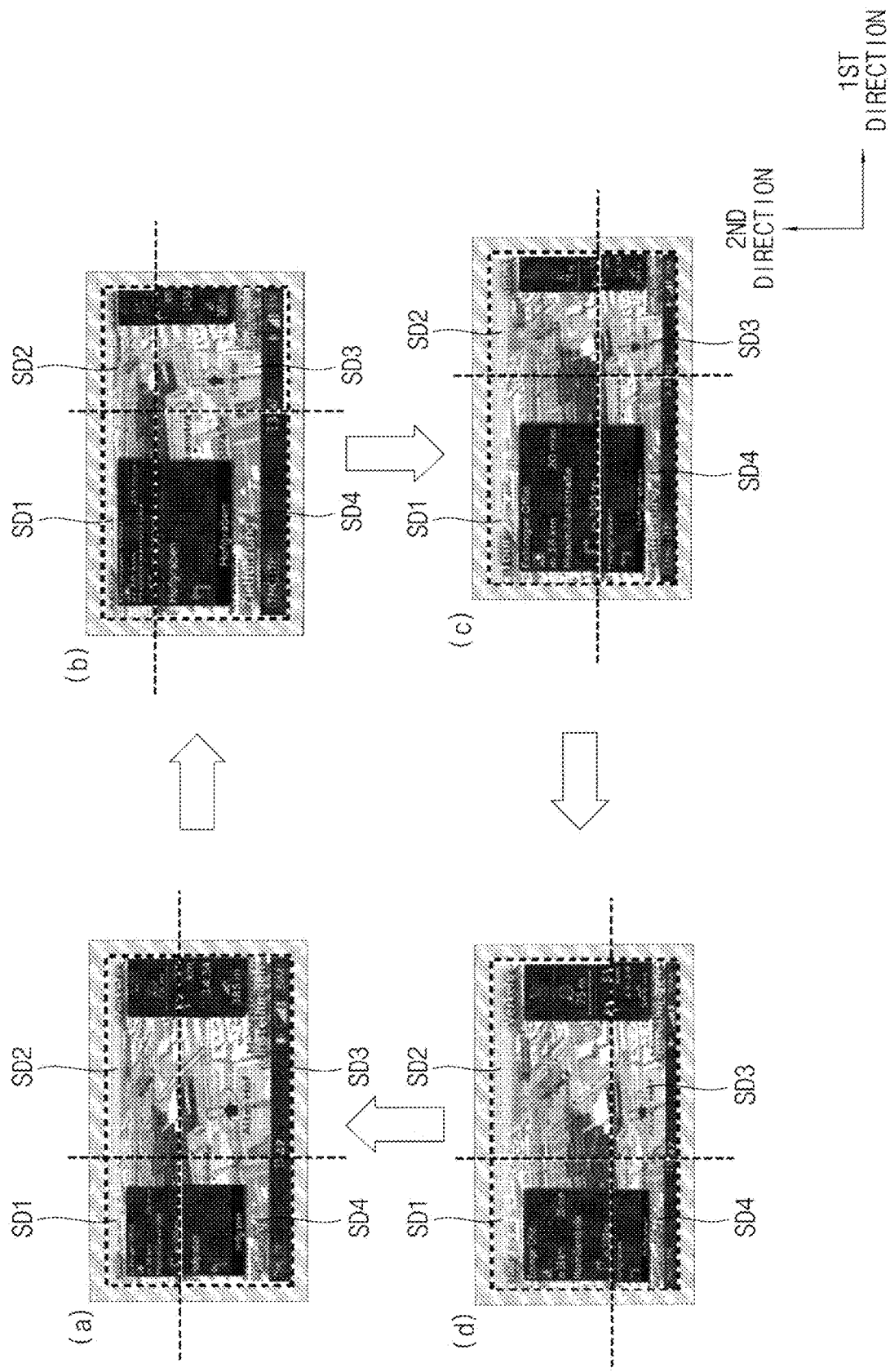
FIG. 3 is a diagram illustrating for describing exemplary embodiments of a second compensator included in the image processing device of FIG. 1.

FIG. 3 is a diagram illustrating for describing exemplary embodiments of a second compensator 160 (refer to FIG. 1) included in the image processing device of FIG. 1.

The first compensating signal SC1 (refer to FIG. 1) may be provided to the second compensator 160 when the image data is the still image. Referring to FIG. 3, the second compensator 160 may divide the image data in the first direction (e.g., horizontal direction) and the second direction (e.g., vertical direction). The second compensator 160 may divide the image data into a first sub-image data SD1, a second sub-image data SD2, a third sub-image data SD3, and a fourth sub-image data SD4. The second compensator 160 may reduce one of the sub-image data. In an exemplary embodiment, the second compensator 160 may reduce the first sub-image data SD1 as described in (a), for example. The first sub-image data SD1 may be reduced in the first direction and the second direction based on the predetermined scaling ratio. Here, the second sub-image data SD2 may be expanded in the first direction and be reduced in the second direction. The third sub-image data SD2 may be expanded in the first direction and the second direction. The fourth sub-image data SD4 may be reduced in the first direction and be expanded in the second direction. The second compensator 160 may reduce the second sub-image data SD2 as described in (b). The second sub-image data SD2 may be reduced in the first direction and the second direction based on the predetermined scaling ratio. Here, the first sub-image data SD1 may be expanded in the first direction and be reduced in the second direction. The third sub-image data SD3 may be reduced in the first direction and be expanded in the second direction. The fourth sub-image data SD4 may be expanded in the first direction and the second direction. The second compensator 160 may reduce the third sub-image data SD3 as described in (c). The third sub-image data SD3 may be reduced in the first direction and the second direction based on the predetermined scaling ratio. Here, the first sub-image data SD1 may be expanded in the first direction and the second direction. The second sub-image data SD2 may be reduced in the first direction and be expanded in the second direction. The fourth sub-image data SD4 may be expanded in the first direction and be reduced in the second direction. The second compensator 160 may reduce the fourth sub-image data SD4 as described in (d). The fourth sub-image data SD4 may be reduced in the first direction and the second direction based on the predetermined scaling ratio. Here, the first sub-image data SD1 may be reduced in the first direction and be expanded in the second direction. The second sub-image data SD2 may be expanded in the first direction and the second direction. The third sub-image data SD3 may be expanded in the first direction and be reduced in the second direction. As described above, the second compensator 160 may prevent the image sticking that occurs on the display panel by reducing one of the sub-image data and controlling the scaling ratios of the sub-image data that are not reduced. Although the second compensator 160 that sequentially reduces the first sub-image data SD1, the second sub-image data SD2, the third sub-image data SD3, and the sub-image data SD4 is described in FIG. 3, an operation of the second compensator 160 is not limited thereto. In an exemplary embodiment, the second compensator 160 may randomly reduce the first sub-image data SD1, the second sub-image data SD2, the third sub-image data SD3, and the sub-image data SD4, for example.

Figure 4:
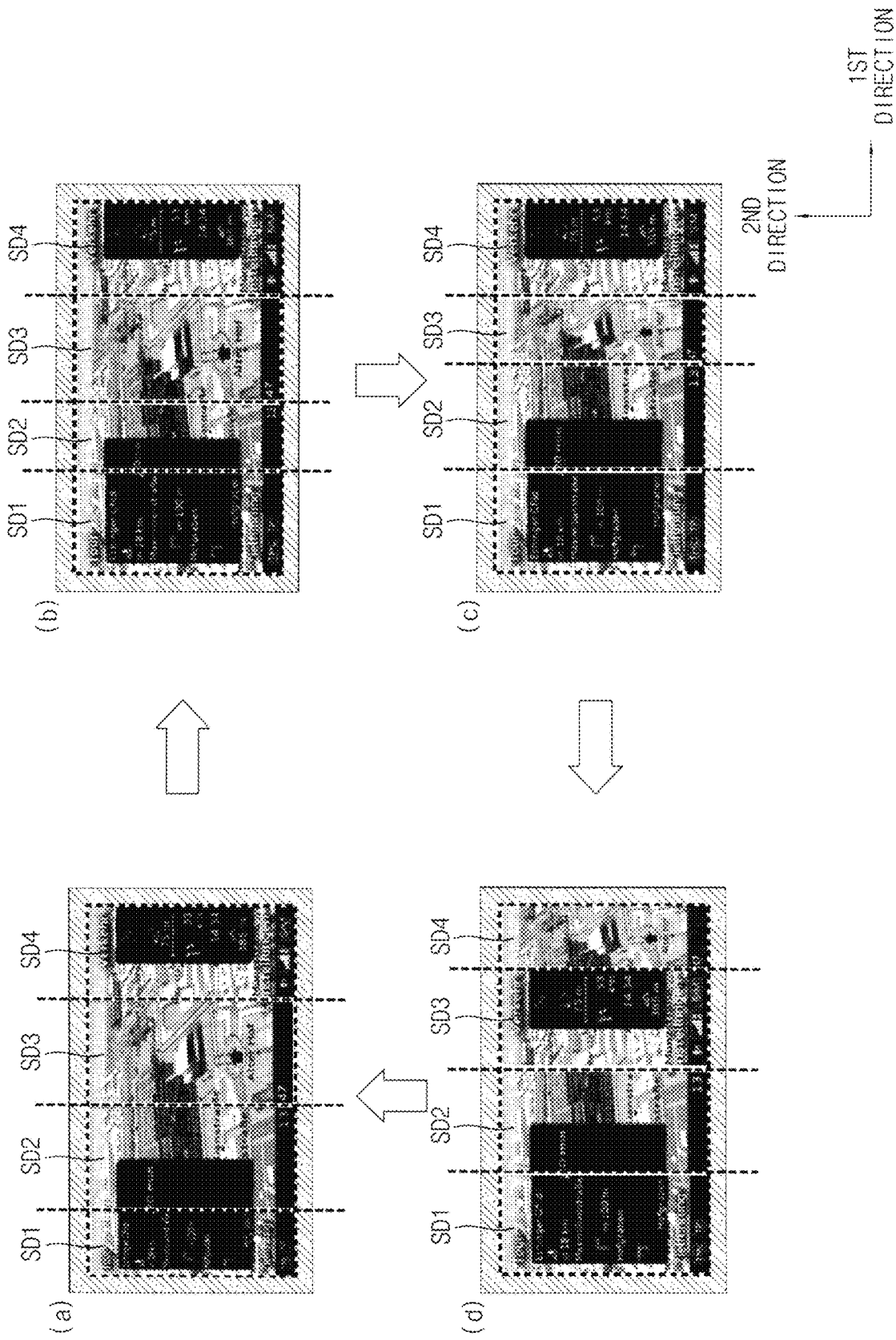
FIG. 4 is a diagram illustrating for describing another exemplary embodiment of a second compensator included in the image processing device of FIG. 1.

FIG. 4 is a diagram illustrating for describing another exemplary embodiment of a second compensator 160 (refer to FIG. 1) included in the image processing device of FIG. 1.

The first compensating signal SC1 (refer to FIG. 1) may be provided to the second compensator 160 when the image data is the still image. Referring to FIG. 4, the second compensator 160 may divide the image data in the first direction. The second compensator 160 may divide the image data into a first sub-image data SD1, a second sub-image data SD2, a third sub-image data SD3, and a fourth sub-image data SD4. The second compensator 160 may reduce one of the sub-image data. In an exemplary embodiment, the second compensator 160 may reduce the first sub-image data SD1 as described in (a), for example. The first sub-image data SD1 may be reduced in the first direction based on the predetermined scaling ratio. Here, the second sub-image data SD2, the third sub-image data SD3, and the fourth sub-image data SD4 may be expanded in the first direction. The second compensator 160 may reduce the second sub-image data SD2 as described in (b). The second sub-image data SD2 may be reduced in the first direction based on the predetermined scaling ratio. Here, the first sub sub-image data SD1, the third sub-image data SD3, and the fourth sub-image data SD4 may be expanded in the first direction. The second compensator 160 may reduce the third sub-image data SD3 as described in (c). The third sub-image data SD3 may be reduced in the first direction based on the predetermined scaling ratio. Here, the first sub-image data SD1, the second sub-image data SD2, and the fourth sub-image data SD4 may be expanded in the first direction. The second compensator 160 may reduce the fourth sub-image data SD4 as described in (d). The fourth sub-image data SD4 may be reduced in the first direction based on the predetermined scaling ratio. Here, the first sub-image data SD1, the second sub-image data SD2, and the third sub-image data SD3 may be expanded in the first direction.

Figure 5:
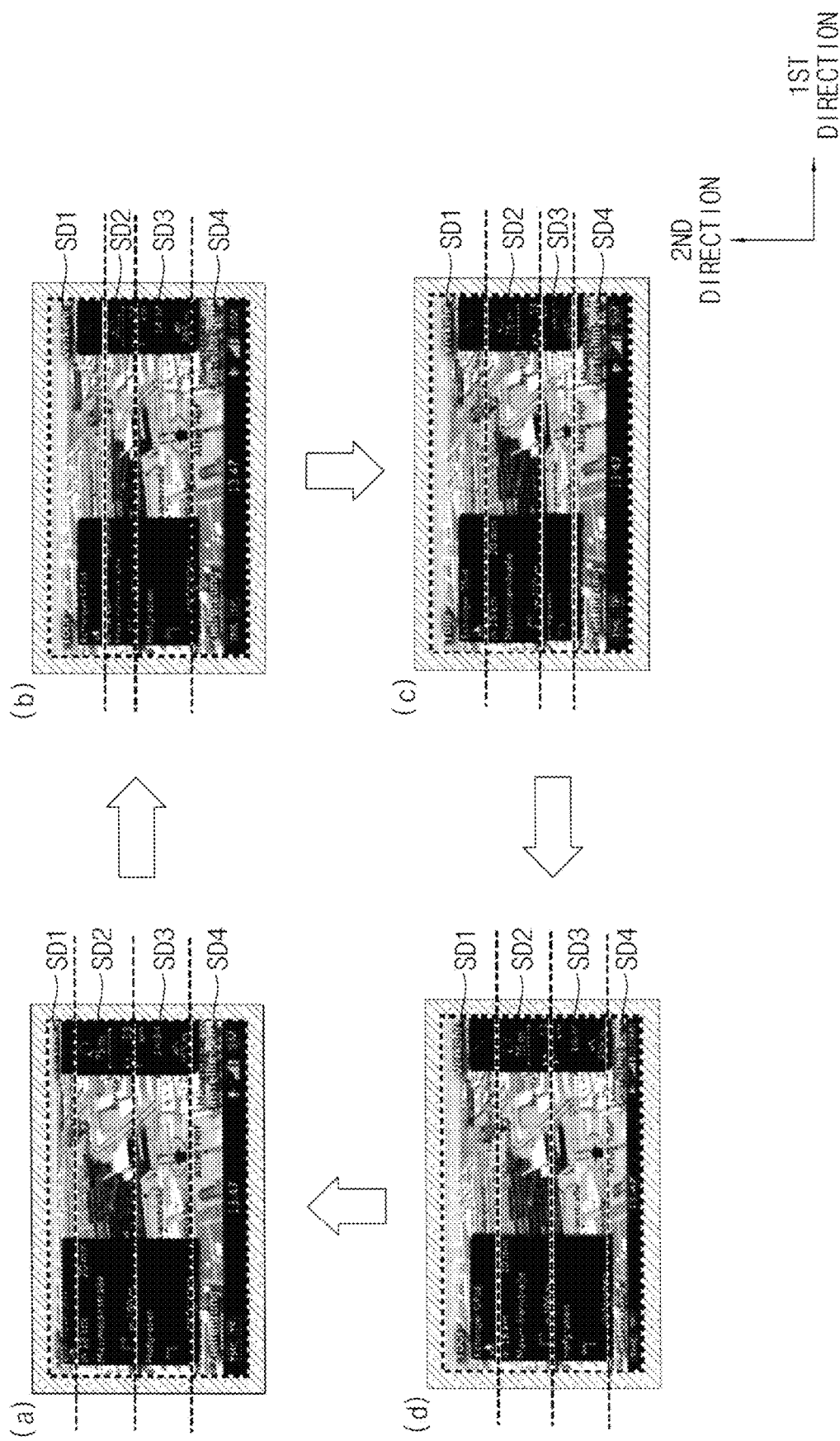
FIG. 5 is a diagram illustrating for describing another exemplary embodiment of a second compensator included in the image processing device of FIG. 1.

FIG. 5 is a diagram illustrating for describing another exemplary embodiment of a second compensator 160 included in the image processing device of FIG. 1.

The first compensating signal SC1 may be provided to the second compensator 160 when the image data is the still image. Referring to FIG. 5, the second compensator 160 may divide the image data in the second direction. The second compensator 160 may divide the image data into a first sub-image data SD1, a second sub-image data SD2, a third sub-image data SD3, and a fourth sub-image data SD4. The second compensator 160 may reduce one of the sub-image data. In an exemplary embodiment, the second compensator 160 may reduce the first sub-image data SD1 as described in (a), for example. The first sub-image data SD1 may be reduced in the second direction based on the predetermined scaling ratio. Here, the second sub-image data SD2, the third sub-image data SD3, and the fourth sub-image data SD4 may be expanded in the second direction. The second compensator 160 may reduce the second sub-image data SD2 as described in (b). The second sub-image data SD2 may be reduced in the second direction based on the predetermined scaling ratio. Here, the first sub sub-image data SD1, the third sub-image data SD3, and the fourth sub-image data SD4 may be expanded in the second direction. The second compensator 160 may reduce the third sub-image data SD3 as described in (c). The third sub-image data SD3 may be reduced in the second direction based on the predetermined scaling ratio. Here, the first sub-image data SD1, the second sub-image data SD2, and the fourth sub-image data SD4 may be expanded in the second direction. The second compensator 160 may reduce the fourth sub-image data SD4 as described in (d). The fourth sub-image data SD4 may be reduced in the second direction based on the predetermined scaling ratio. Here, the first sub-image data SD1, the second sub-image data SD2, and the third sub-image data SD3 may be expanded in the second direction.

Figure 6:
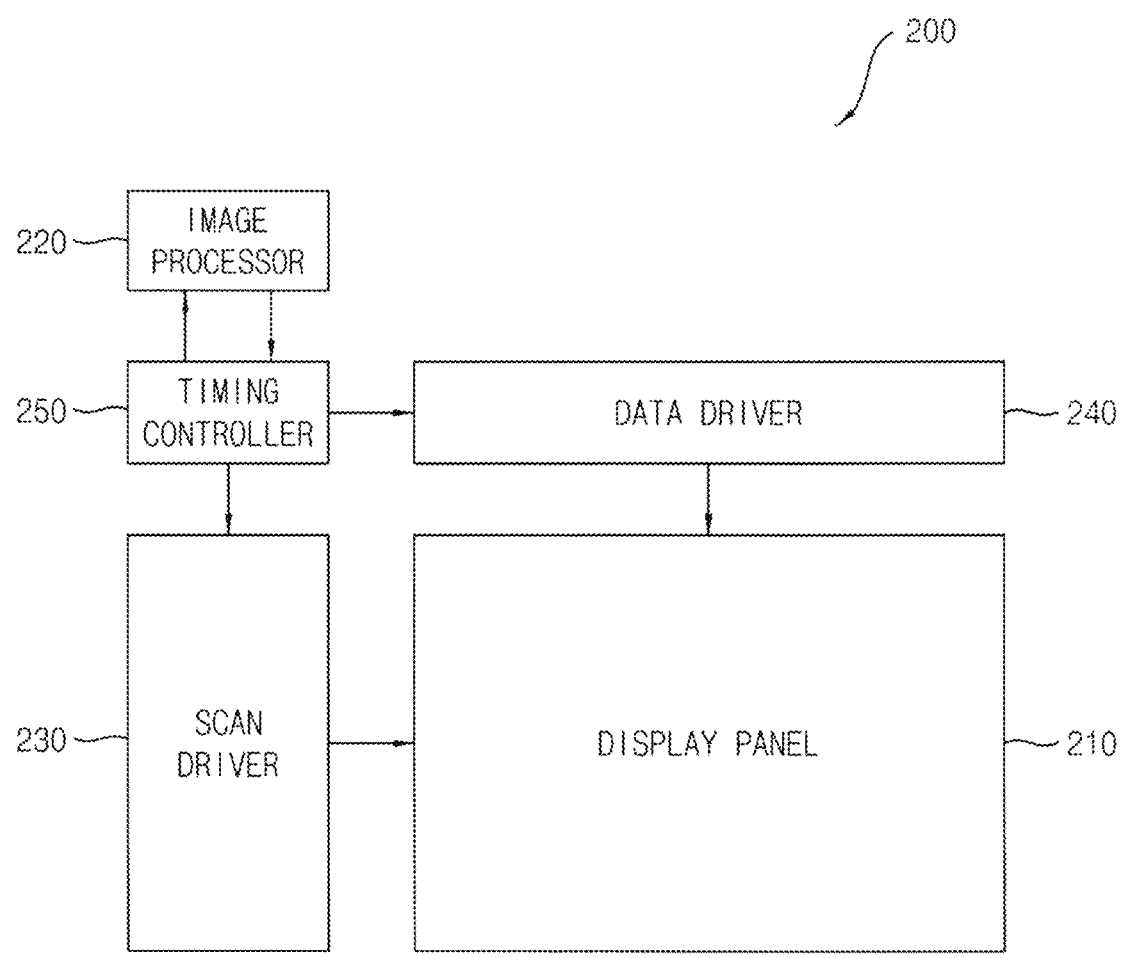
FIG. 6 is a block diagram illustrating exemplary embodiments of a display device according to the invention.

FIG. 6 is a block diagram illustrating a display device according to exemplary embodiments.

Referring to FIG. 6, a display device 200 may include a display panel 210, an image processor 220, a scan driver 230, a data driver 240, and a timing controller 250. Here, the image processor 220 is corresponding to the image processing device 100 of FIG. 1.

The display panel 210 may include a plurality of pixels. The plurality of data lines and the plurality of scan lines are arranged on the display pane 210. The plurality of pixel is disposed in intersection regions of the data lines and the scan lines. In exemplary embodiments, each of the pixels may include a pixel circuit, a driving transistor, and an organic light emitting diode. In this case, the driving transistor may control a driving current flowing through the organic light emitting diode based on the data signal, where the data signal is provided to the driving transistor via the data line in response to the scan signal, where the scan signal is provided via the scan line.

The scan driver 230 may provide the scan signal to the pixels through the plurality of scan lines. The data driver 240 may provide the data signal to the pixels through the plurality of data lines in response to the scan signal. The timing controller 250 may generate control signals that control the scan driver 230 and the data driver 240.

The image processor 220 may gradually change a scaling ratio of an image data of which a center part is fixed or change scaling ratios of sub-image data into which the image data is divided based on whether the image data provided to the display panel 210 is a still image or a motion picture image. Specifically, the image processor 220 may include an image determiner, a first compensator, and a second compensator. The image determiner may determine whether the image data is the still image or the motion picture image. The image determiner may provide a first compensating signal to the first compensator or the second compensator when the image data is the still image. The image determiner may provide a second compensating signal to the first compensator or the second compensator when the image data is the motion picture data. Here, the image determiner may alternately provide the first compensating signal to the first compensator and the second compensator in a predetermined cycle when the image data is the still image. The first compensator may gradually change the scaling ratio of the image data of which a center part is fixed. The first compensator may gradually reduce or expand the image data of which the center part is fixed in response to the first compensating signal. Here, the first compensator may reduce or expand the image data based on the scaling ratio.

The first compensator may gradually reduce or expand the image data in a predetermined cycle when the first compensating signal is provided to the first compensator. The first compensator may restore the image data by gradually expanding the image data of which the center part is fixed in response to the second compensating signal. The second compensator may divide the image data into a plurality of sub-image data and change the scaling ratios of the sub-image data different from each other. The second compensator may reduce one of the sub-image data and control scaling ratios of sub-image data that are not reduced in response to the first compensating signal. The second compensator may restore the sub-image data of which scaling ratios are changed in response to the second compensating signal. The image processor 220 may be coupled to the timing controller 250 as described in FIG. 6. In an alternative exemplary embodiment, the image processor 220 may be located in the timing controller 250.

As described above, the display device 200 may include the first compensator that prevents the image sticking by reducing or expanding the image data of which the center part is fixed and the second compensator that prevents the image sticking by changing the scaling ratios of the sub-image data of which the edge is fixed when the image data is the still image. Thus, the image sticking that occurs on the display panel 210 may be prevented.

Figure 7:
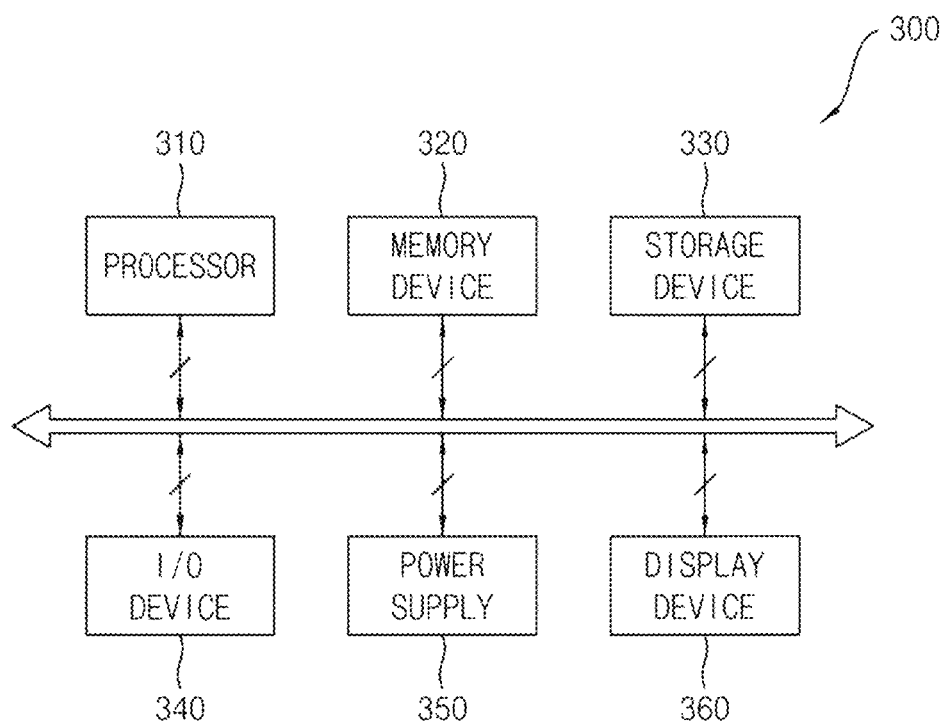
FIG. 7 is a block diagram illustrating an electronic device that includes the display device of FIG. 6.
Figure 8:
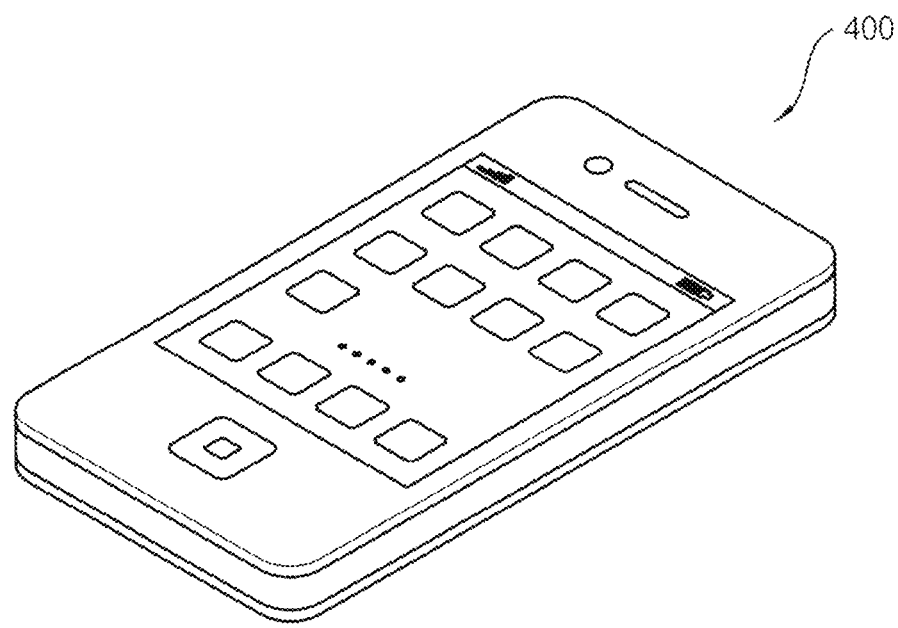
FIG. 8 is a diagram illustrating an exemplary embodiment in which the electronic device

FIG. 7 is a block diagram illustrating an electronic device that includes the display device of FIG. 6 and FIG. 8 is a diagram illustrating an exemplary embodiment in which the electronic device FIG. 7 is implemented as a smart phone.

Referring to FIGS. 7 and 8, the electronic device 300 may include a processor 310, a memory device 320, a storage device 330, an input/output ("I/O") device 340, a power supply 350, and a display device 360. Here, the display device 360 may correspond to the display device 200 of FIG. 6. In addition, the electronic device 200 may further include a plurality of ports for communicating a video card, a sound card, a memory card, a universal serial bus ("USB") device, other electronic device, etc. Although it is illustrated in FIG. 8 that the electronic device 300 is implemented as a smart-phone 400, a kind of the electronic device 300 is not limited thereto.

The processor 310 may perform various computing functions. In an exemplary embodiment, the processor 310 may be a micro processor, a central processing unit ("CPU"), etc., for example. The processor 310 may be coupled to other components via an address bus, a control bus, a data bus, etc. In an exemplary embodiment, the processor 310 may be coupled to an extended bus such as peripheral component interconnect ("PCI") bus, for example. The memory device 320 may store data for operations of the electronic device 200. In an exemplary embodiment, the memory device 320 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc, and/or at least one volatile memory device such as a dynamic random access memory ("DRAM") device, a static random access memory ("SRAM") device, a mobile DRAM device, etc., for example. In an exemplary embodiment, the storage device 330 may be a solid stage drive ("SSD") device, a hard disk drive ("HDD") device, a CD-ROM device, etc., for example.

In an exemplary embodiment, the I/O device 340 may be an input device such as a keyboard, a keypad, a touchpad, a touch-screen, a mouse, etc, and an output device such as a printer, a speaker, etc., for example. In exemplary embodiments, the display device 360 may be included in the I/O device 340. The power device 350 may provide a power for operations of the electronic device 200. The display device 360 may communicate with other components via the buses or other communication links. As described above, the display device 360 may include a display panel, an image processor, a scan driver, a data driver, and a timing controller. The image processor may gradually change a scaling ratio of an image data of which a center part is fixed or change scaling ratios of sub-image data into which the image data is divided based on whether the image data provided to the display panel is a still image or a motion picture image. Specifically, the image processor may include an image determiner, a first compensator, and a second compensator. The image determiner may provide a first compensating signal when the image data is the still image. The image determiner may provide a second compensating signal when the image data is the motion picture image. The image determiner may alternately provide the first signal to the first compensator and the second compensator when the image data is the still image. The first compensator may gradually change the scaling ratio of the image data of which the center part is fixed. The first compensator may gradually reduce or expand the image data in a predetermined cycle in response to the first compensating signal. The first compensator may restore the image data by gradually expanding the image data that is changed for preventing an image sticking when the second compensating signal is provided to the first compensator. The second compensator may divide the image data into the sub-image data and control the scaling ratios of the sub-image data different from each other. The second compensator may reduce one of the sub-image data and control the scaling ratios of the sub-image data that is not reduced in response to the first compensating signal. The second compensator may restore the sub-image data that are changed for preventing the image sticking when the second compensating signal is provided to the second compensator.

As described above, the electronic device 300 of FIG. 7 may include the display device 360 that prevents the image sticking occurs on the display panel. The display device may include the first compensator that prevents the image sticking by reducing or expanding the image data of which the center part is fixed and the second compensator that prevents the image sticking by changing the scaling ratios of the sub-image data of which the edge is fixed when the image data is the still image. Thus, the image sticking that occurs on the display panel may be prevented.

The invention may be applied to a display device and an electronic device having the display device. In an exemplary embodiment, the invention may be applied to a computer monitor, a laptop, a digital camera, a cellular phone, a smart phone, a smart pad, a television, a personal digital assistant ("PDA"), a portable multimedia player ("PMP"), a MP3 player, a navigation system, a game console, a video phone, etc., for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An image processing method of a display device comprising:

determining whether an image data that displays on a display panel that has a plurality of pixels is a still image or a motion picture image by comparing the image data of a current frame to the image data of a previous frame;

spatially dividing the display panel into first through fourth display areas in a first direction and a second direction such that the first through fourth display areas together define the display panel, and dividing the image data into first through fourth sub-image data respectively corresponding to the first through fourth display areas that respectively has first pixels to fourth pixels of the plurality of pixels in the first direction and the second direction when the image data is the still image, wherein the second display area is adjacent to the first display area in the first direction, the third display area is adjacent to the second display area in the second direction, and the fourth display area is adjacent to the third display area in the first direction;

reducing the first sub-image data corresponding to the first display area that has the first pixels based on a predetermined scaling ratio;

expanding the second sub-image data corresponding to the second display area that has the second pixels in the first direction and reducing the second sub-image data in the second direction, expanding the third sub-image data corresponding to the third display area that has the third pixels in the first direction and the second direction, and reducing the fourth sub-image data corresponding to the fourth display area that has the fourth pixels in the first direction and expanding the fourth sub-image data in the second direction.

2. The image processing method of the display device of claim 1, wherein the first sub-image data, the second sub-image data, the third sub-image data, and the fourth sub-image data are sequentially reduced.

3. The image processing method of the display device of claim 1, further includes:

providing first compensating signal when the image data is the still image; and providing second compensating signal when the image data is the motion picture image.

4. The image processing method of the display device of claim 1, further includes:

restoring the sub-image data of which scaling ratio is changed.

5. The image processing method of the display device of claim 1, further includes:

changing the scaling ratio of the image data of which center part is fixed when the image data is the still image.

6. The image processing method of the display device of claim 5, wherein the scaling ratio of the image data of which center part is fixed is gradually reduced.

7. The image processing method of the display device of claim 5, wherein the scaling ratio of the image data of which center part is fixed is gradually extended.

* * * * *